(12) United States Patent
Livingston (10) Patent No.: US 6,750,889 B1
(45) Date of Patent: Jun. 15, 2004

(54) USER INTERFACE APPARATUS FOR DISPLAYING A RANGE INDICATOR FOR SETTING A PLURALITY OF TARGET OBJECTS

(75) Inventor: Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 09/668,053

(22) Filed: Sep. 21, 2000

(51) Int. Cl.$^7$ ................................................. G09G 5/00
(52) U.S. Cl. ........................ 345/833; 345/974; 345/764; 345/771; 345/773; 345/832; 345/845; 345/970; 345/184
(58) Field of Search ................................ 345/769, 773, 345/832, 833, 835, 974, 779, 810, 840, 845, 856, 184, 777; D13/164

(56) References Cited

U.S. PATENT DOCUMENTS

| | | | | |
|---|---|---|---|---|
| 5,519,828 A | * | 5/1996 | Rayner | 345/723 |
| 5,767,852 A | * | 6/1998 | Keller et al. | 345/835 |
| 6,529,216 B1 | * | 3/2003 | Moore et al. | 345/764 |

FOREIGN PATENT DOCUMENTS

| | | |
|---|---|---|
| GB | 2307383 A | 10/1996 |
| GB | 2321377 A | 1/1997 |
| GB | 2336226 A | 1/1999 |

OTHER PUBLICATIONS

"Using Microsoft® Word 97" Bestseller Edition; 1997; pps. 65–74.

* cited by examiner

*Primary Examiner*—John Cabeca
*Assistant Examiner*—Namitha Pillai (57) ABSTRACT

User interface apparatuses, data signals, articles of manufacture, image forming systems, and processor-implemented methods are provided. One aspect of the invention provides a user interface apparatus including a display device configured to display visual images; and digital processing circuitry coupled with the display device and configured to control the display device to display a range indicator corresponding to an adjustment range and comprising a plurality of positions, to display an active indicator relative to the range indicator at one of the positions corresponding to a plurality of values of a plurality of targets, and to display an inactive indicator relative to the range indicator at another one of the positions corresponding to the value of one of the targets.

31 Claims, 7 Drawing Sheets

USER INTERFACE APPARATUS FOR DISPLAYING A RANGE INDICATOR FOR SETTING A PLURALITY OF TARGET OBJECTS

FIELD OF THE INVENTION

The present invention relates to user interface apparatuses, data signals, articles of manufacture, image forming systems, and processor-implemented methods.

BACKGROUND OF THE INVENTION

In complex software, it is becoming more commonplace to utilize graphical user interfaces (GUI) to interface with a user. Such interfaces utilize menus, controls and toolbars, for example, to present an attractive interface to the user.

One example of a control common to graphical user interfaces is a slider control which can be configured to set or adjust values on a continuous range of values. Slider controls may also be referred to as track bar controls and typically consist of a bar that defines an extent or range of adjustment. An indicator is provided that shows the current value of the control and provides means for changing the value. Slider controls may be arranged in vertical or horizontal orientations and often have various heights and lengths corresponding to a given application. A user moves a slide indicator by dragging it to a particular location or, alternatively, by clicking in a hot zone area of the bar. Such operation results in the slide indicator moving to the selected location.

It is becoming more conventional to use graphical user interfaces with controls that may apply to more than one object. Such controls have intermediate states which represent differing settings for the objects represented. An example is an object button, radio button or check box in a software installer where the check box identifies a package of components to be installed. If all of the components of the package are to be installed, then the package's check box is checked by the user. If none of the components of the package are to be installed, then the package's check box is not checked. When some of the components are to be installed and some are not, then the package's check box indicates an intermediate state or a partially checked state. Such a solution is typically convenient in software where a given control or set of controls may apply, at different times, to more than a single target object.

However, such conventional controls show a single setting that do not adequately reflect a true state of the control when multiple settings are to be represented. Accordingly, there exists a need for improved user interfaces.

SUMMARY OF THE INVENTION

The invention provides user interface apparatuses, data signals, articles of manufacture, image forming systems, and processor-implemented methods. One aspect of the present invention proposes a user interface that applies to one set of target objects in one instance, and to another target object or another set of target objects in another instance. Aspects of the present invention provide proper, additional feedback to a user with a user interface representing multiple target objects.

According to a first aspect of the invention, a user interface apparatus comprises: a display device configured to display visual images; and digital processing circuitry coupled with the display device and configured to control the display device to display a range indicator corresponding to an adjustment range and comprising a plurality of positions, to display an active indicator relative to the range indicator at one of the positions corresponding to a plurality of values of a plurality of targets, and to display an inactive indicator relative to the range indicator at another one of the positions corresponding to the value of one of the targets.

Another aspect of the invention provides a data signal embodied in a transmission medium comprising: processor-usable code configured to cause digital processing circuitry to display a range indicator corresponding to an adjustment range and comprising a plurality of positions; processor-usable code configured to cause digital processing circuitry to display an active indicator relative to the range indicator at one of the positions corresponding to a plurality of values of a plurality of targets; and processor-usable code configured to cause digital processing circuitry to display an inactive indicator relative to the range indicator at another one of the positions corresponding to the value of one of the targets.

Another aspect of the invention provides an article of manufacture comprising: a processor-usable medium having processor-useable code embodied therein and configured to cause processing circuitry to perform steps comprising: displaying a range indicator corresponding to an adjustment range and comprising a plurality of positions; displaying an active indicator relative to the range indicator at one of the positions and corresponding to a plurality of values of a plurality of targets; and displaying an inactive indicator relative to the range indicator at another one of the positions and corresponding to the value of one of the targets.

The present invention provides in another aspect an image forming system comprising: a host device configured to communicate data corresponding to an image; and an image forming device coupled with the host device and configured to receive the data and to provide the image upon media responsive to the received data; wherein at least one of the host device and the image forming device comprise: a display device configured to display visual images; and digital processing circuitry coupled with the display device and configured to control the display device to display a range indicator corresponding to an adjustment range comprising a plurality of positions, to display an active indicator relative to the range indicator at one of the positions corresponding to a plurality values of a plurality of targets, and to display an inactive indicator relative to the range indicator at another one of the positions corresponding to the value of one of the targets.

Another aspect provides a processor-implemented method comprising: displaying a range indicator corresponding to an adjustment range comprising a plurality of positions; displaying an active indicator relative to the range indicator at one of the positions corresponding to a plurality of values of a plurality of targets; and displaying an inactive indicator relative to the range indicator at another one of the positions and corresponding to the value of one of the targets.

Yet another aspect provides a processor-implemented method comprising: displaying a slider control graphical user interface including a range indicator corresponding to an adjustment range comprising a plurality of positions; displaying indicia corresponding to the positions of the range indicator; determining a composite value from a plurality of values of a plurality of targets; displaying an active indicator of the slider control graphical user interface relative to the range indicator at one of the positions corresponding to the composite value; displaying a plurality of inactive indicators of the slider control graphical user interface relative to the range indicator at other positions corresponding to values of respective ones of the targets; displaying a scope identifier during the displayings of the range indicator, active indicator and inactive indicators of the slider control graphical user interface; receiving control input; selecting and moving the active indicator to another one of the positions responsive to the receiving; and applying the value corresponding to the another one position to the targets.

Other features and advantages of the invention will become apparent to those of ordinary skill in the art upon review of the following detailed description, claims, and drawings.

DESCRIPTION OF THE DRAWINGS

FIG. 4, FIG. 4A and FIG. 4B are screen displays illustrating exemplary user interfaces according to aspects of the present invention.

DETAILED DESCRIPTION OF PREFERRED EMBODIMENTS

Figure 1:
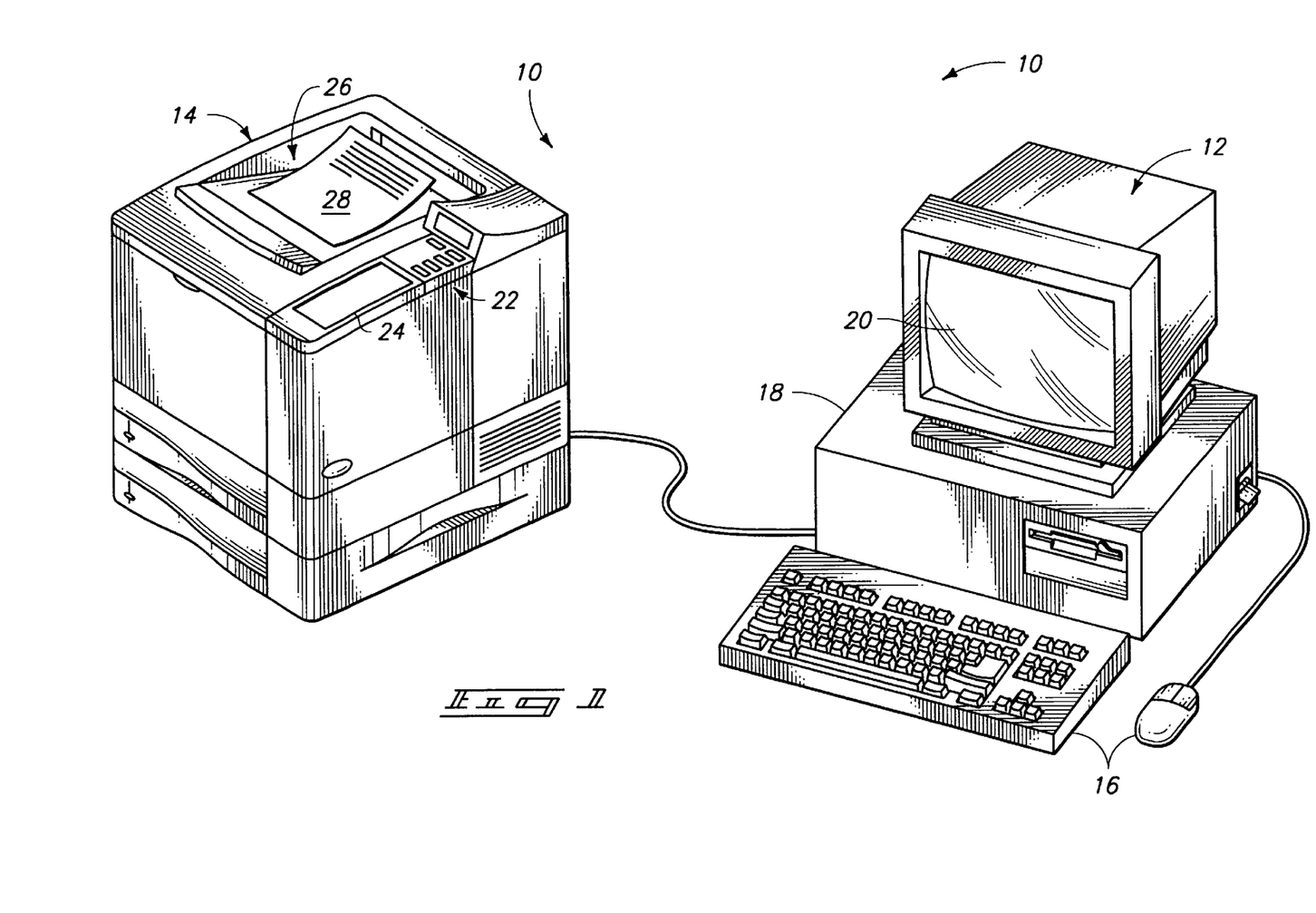
FIG. 1 is an isometric view of an exemplary image forming system according to one aspect of the present invention.

Referring to FIG. 1, an exemplary image forming system 10 embodying aspects of the present invention is illustrated. Aspects of the present invention include a user interface which provides user information regarding operations and/or settings of system 10 and control of operations and/or settings of system 10. User interface aspects of the present invention may be implemented in other system and device configurations. For example, aspects of the present invention may be implemented within any arrangement having appropriate processing circuitry (e.g., microprocessor) and a display device (e.g., computer monitor).

Image forming system 10 described herein includes a host device 12 coupled with an image forming device 14. In the depicted arrangement, host device 12 is implemented as a personal computer (PC). An exemplary image forming device 14 is a printer configured to print images responsive to data and commands from host device 12. Host device 12 is coupled with image forming device 14 and configured to communicate data corresponding to images to device 14. Image forming device 14 is configured to receive the data and to provide images upon media responsive to the received data. Other configurations of system 10, host device 12, and image forming device 14 are possible.

The depicted arrangement of host device 12 includes user input devices 16. User input devices 16 include a mouse and a keyboard for receiving control input in the form of depressed keys or mouse movement from a user in the described arrangement. User input devices 16 are coupled with a housing 18 which encloses further components of personal computer 12 described below with respect to FIG. 2. A display device 20 is coupled with housing 18 and provides visible images to a user. Display device 20 is implemented as a monitor in the described arrangement.

The depicted image forming device 14 includes a user input device 22 and a display device 24. An exemplary user input device 22 comprises a key pad and an exemplary display device 24 comprises a LCD display or other electronic display. A user of image forming system 10 may input control operations using user input device 22 and view operations, status and other information via visible images presented upon display screen 24. An output area 26 collects media 28 having images formed thereon by image forming device 14.

User interfaces and other visible images depicting functionality and permitting control of system 10, device 12, and/or device 14 are viewable using display devices 20, 24 of host device 12 and/or image forming device 14, respectively. A user can refer to user interfaces displayed upon display devices 20, 24 to obtain information or also implement control operations. An exemplary user interface depicting aspects of the present invention is described in detail below with reference to FIG. 4, FIG. 4A, and FIG. 4B. Host device 12 and image forming device 14 depicting user interfaces are exemplary user interface apparatuses. User interface apparatuses refer to any device capable of depicting user interfaces.

Figure 2:
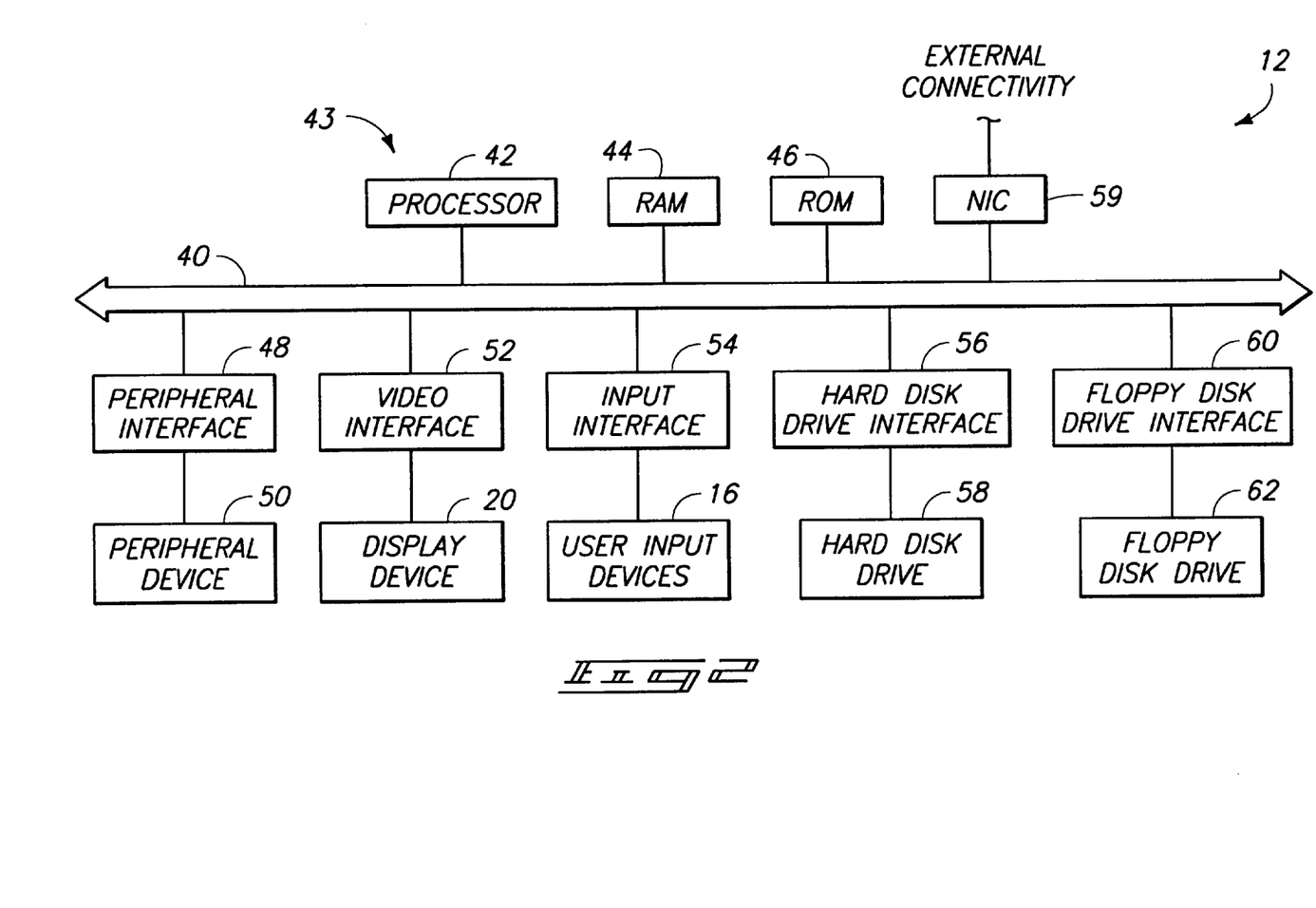
FIG. 2 is a functional block diagram illustrating an exemplary configuration of the host device of the image forming system.

Referring to FIG. 2, an exemplary configuration of host device 12 including internal components thereof is depicted. Host device 12 includes a system bus 40 coupled with respective components. System bus 40 implements bidirectional communications in the depicted arrangement.

A processor 42, random access memory (RAM) 44 and read only memory (ROM) 46 are individually coupled with system bus 40. An exemplary processor 42 is a Pentium III microprocessor available from Intel Corporation and may be referred to as a central processing unit (CPU). Processor 42 comprises digital processing circuitry 43 configured to process executable instructions during operations of host device 12.

RAM 44 and ROM 46 provide system memory of host device 12 in the depicted embodiment. ROM 46 stores basic input/output system (BIOS) instructions or code for use by processor 42. RAM 44 is configured to store executable instructions implementing an operating system (O/S), application programs, printer drivers, etc. Aspects of the invention are described herein with reference to operations of host device 12. One exemplary configuration of host device 12 is configured to utilize a Windows™ operating system programming environment available from Microsoft Corporation.

Host device 12 additionally comprises a peripheral interface arranged to provide connectivity to a peripheral device, such as image forming device 14. Exemplary peripheral interfaces include a serial port and/or a parallel port. A video interface 52 is further provided coupled with display device 20 to provide connectivity to system bus 40. An input interface 54 couples user input devices 16 with system bus 40. Input interface 54 comprises a serial port and/or a parallel port depending upon the configuration of user input devices 16 in an exemplary arrangement.

A hard disk drive interface 56 provides connectivity of system bus 40 with a hard disk drive 58. Hard disk drive 58 is configured to store executable code such as application programs, operating systems, printer drivers, etc. A floppy disk drive 60 is provided to couple a floppy disk drive 62 with system bus 40. A network interface card (NIC) 59 is additionally coupled with system bus 40 and configured to provide external connectivity of host device 12 to remote computers, work stations, and networks, such as the Internet.

Figure 3:
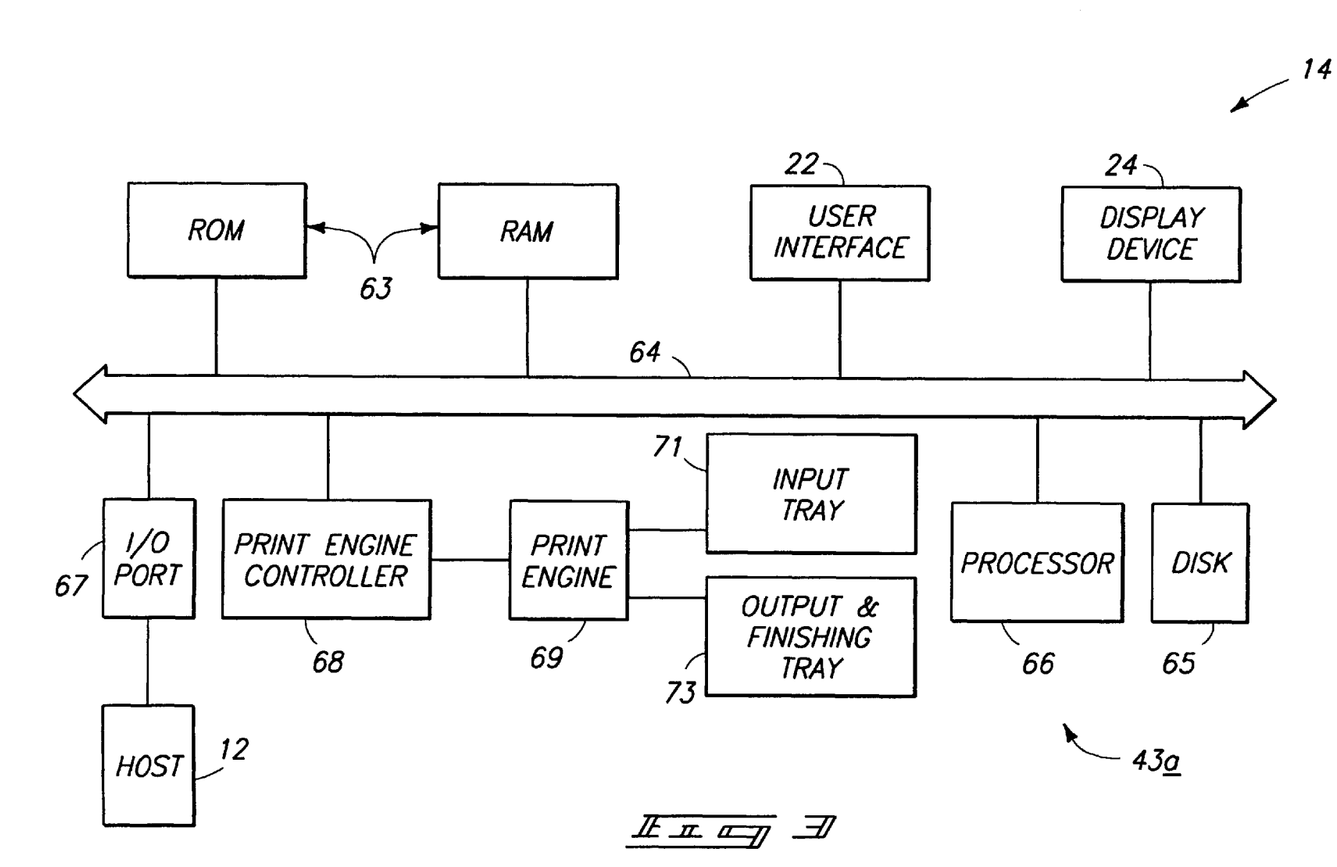
FIG. 3 is a functional block diagram illustrating an exemplary configuration of the image forming device of the image forming system.

Referring to FIG. 3, internal components of an exemplary image forming device 14 are shown. The depicted embodiment of image forming device 14 comprises a hard disk drive storage device 65, and storage devices 63 (depicted as random access memory (RAM) and read only memory (ROM) in the illustrated configuration). Individual storage devices 63, 65 are coupled with a bidirectional bus 64. Random access memory (RAM) storage device 63 provides main memory storage capabilities within image forming device 14 for storing and processing print job data streams received from host device 12. Read only memory storage device 63 contains firmware to implement control of a processor 66 of image forming device 14.

A bus 64 is coupled with additional hardware of the depicted image forming device 14 including an input/output (I/O) port 67, print engine controller 68, print engine 69, input tray 71, and output and finishing tray 73. Processor 66 is implemented as an embedded microprocessor configured to control functions of image forming device 14 in the described configuration. Processor 66 comprises digital processing circuitry 43a of image forming device 14. Processor 66 communicates with hardware elements of image forming device 14 via bus 64.

I/O port 67 comprises one or more input/output devices adapted to couple with host device 12. I/O port 67 comprises a parallel interface which provides communications between image forming device 14 and host device 12 in one configuration. I/O port 67 receives page description language data (or raster data) from host device 12 for processing within image forming device 14.

Print engine controller 68 and associated print engine 69 are coupled to bus 64 and provide print output capability for image forming device 14 in but one embodiment. Sheet media is pulled from input tray 71 into print engine 69 and subsequently directed to output and finishing tray 73. Output and finishing tray 73 includes, in an exemplary embodiment, finishing feature mechanisms such as sheet registration, binding, stapling, punching, and the like, and may include one or more bins for collation or "mailbox" usage purposes. Input tray 71 may also include a plurality of input trays for varied media selection.

According to the described embodiment, print engine 69 is a multi-resolution capable engine. For example, it can print, selectively, at 600 or 1200 dots per inch (dpi). For purposes of this disclosure, print engine 69 is a laser printer that employs an electrophotographic drum imaging system. Other image forming systems are utilized in other embodiments.

Figure 4:
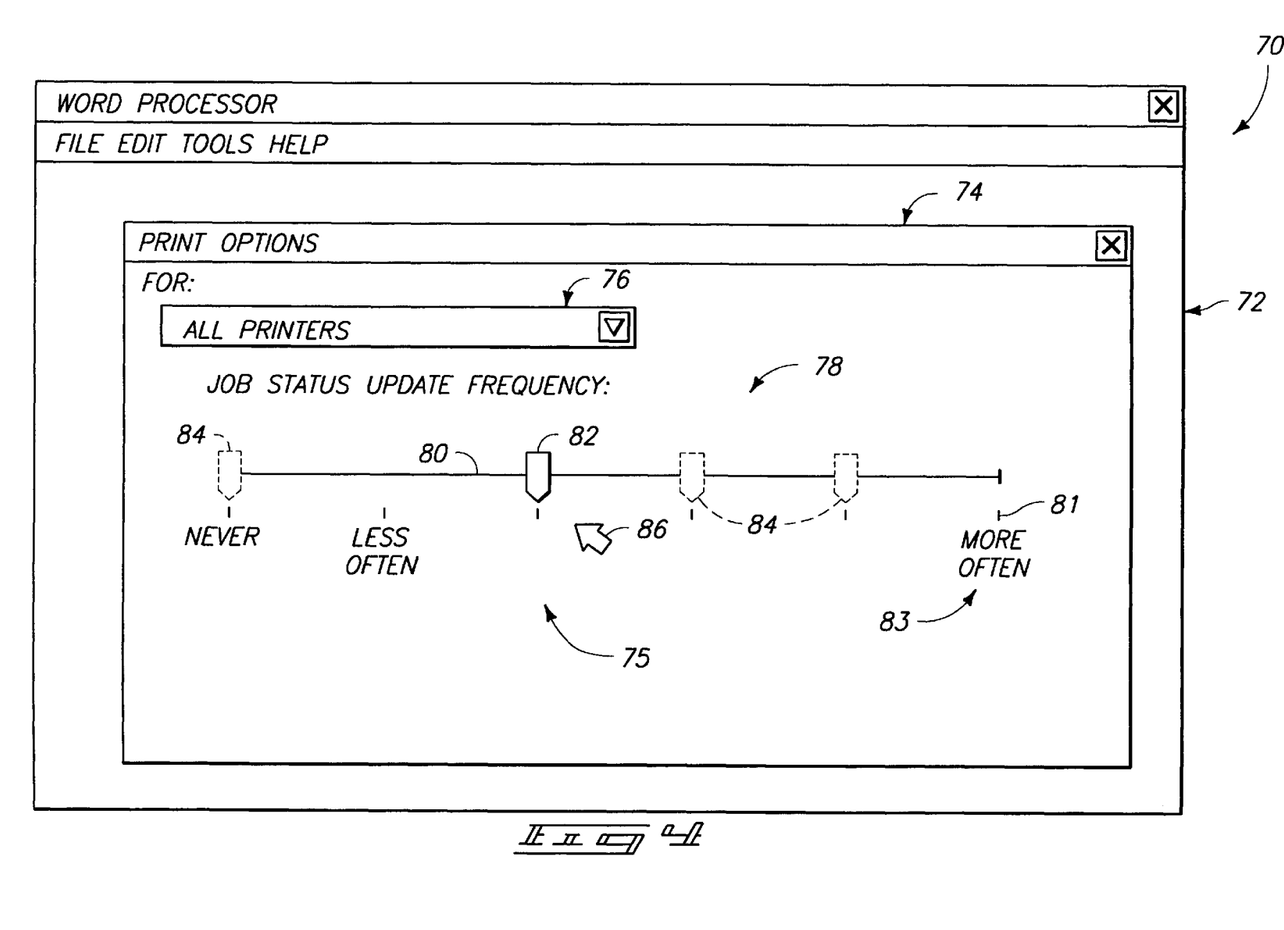
Figure 4B:
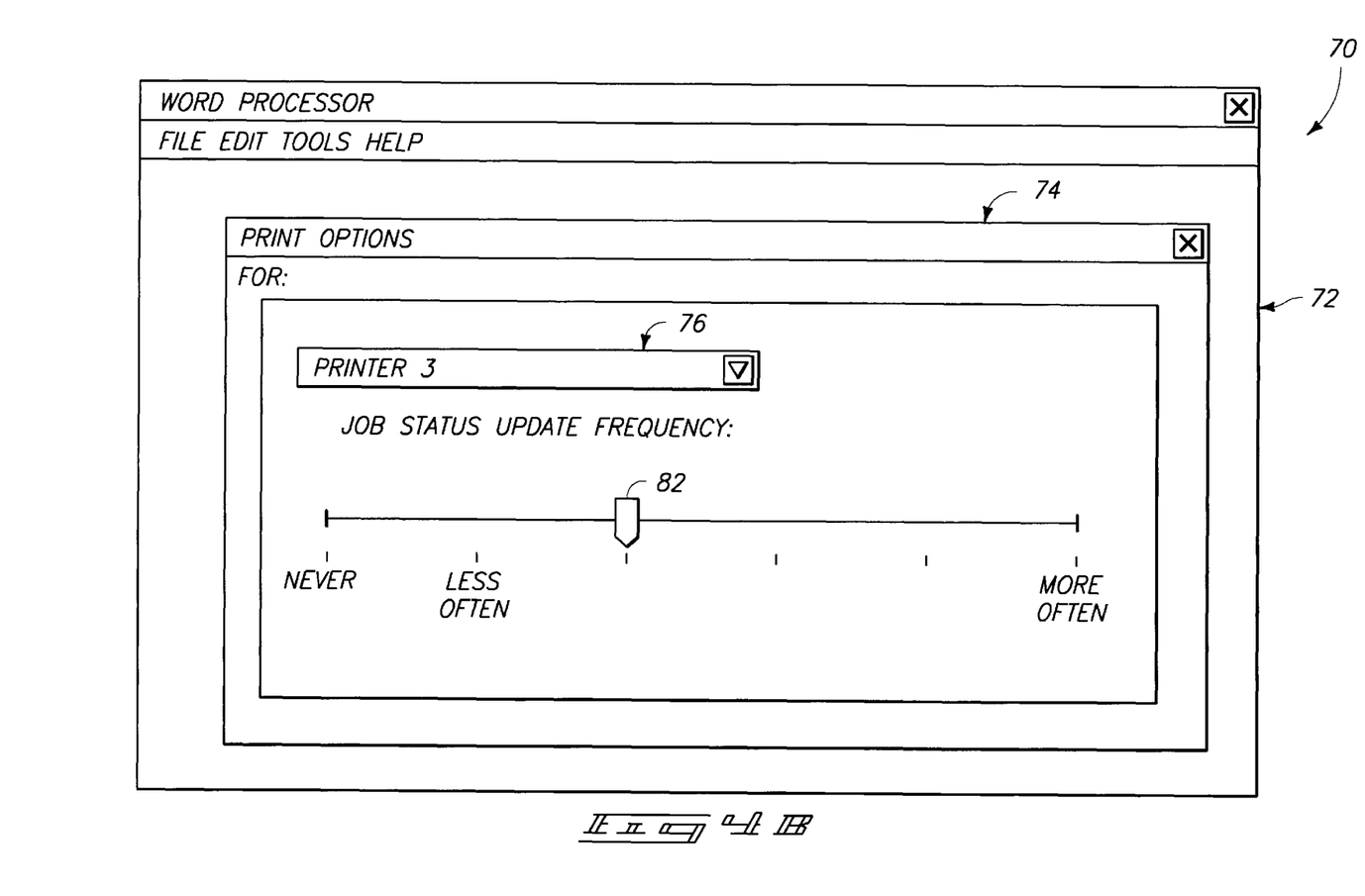

FIG. 4, FIG. 4A and FIG. 4B are illustrations depicting screen displays including an exemplary user interface according to aspects of the present invention. The depicted screen displays may be generated using either one or both of display devices 20, 24 responsive to control from respective processors 42, 66 of host device 12 and image forming device 14. In the described representation, FIG. 4, FIG. 4A and FIG. 4B are generated upon display device 20 during execution of a word processing application, such as Corel WordPerfect Suite 8 available from Corel Corporation, and the Windows™ operating system by processor 42. Such depicted representation is exemplary and the illustrated user interfaces may be generated with other user interface apparatus configurations using other applications, devices, processing circuitry etc. The discussion proceeds with reference host device 12. It is to be understood that such description is exemplary to illustrate aspects of the present invention and the present invention may be implemented in other devices capable of display.

Referring initially to FIG. 4, a screen display 70 generated using an appropriate display device 20 is shown. Display device 20 is controlled by appropriate digital processing circuitry 43 to depict a window 72 illustrating exemplary printer driver operations in conjunction with word processing operations in the presently described exemplary embodiment. Following appropriate commands executed by the user, such as ordering a print job or obtaining print job options, a supplemental printer dialog box 74 is displayed by processor 42 within window 72 using display device 20.

Dialog box 74 implements a user interface 75 according to aspects of the present invention. The depicted arrangement provides user interface 75 as a graphical user interface (GUI) for viewing by a user. Dialog box 74 includes a drop-down list box 76 as well as an object control 78. The depicted configuration of object control 78 is implemented as a slider control. Other arrangements or control configurations of user interface 75 are possible.

The depicted arrangement of object control 78 includes a range indicator 80, active indicator 82, and plural inactive indicators 84. Range indicator 80 is also referred to as a bar or rail and includes a plurality of positions. In the depicted configuration of dialog box 74, a plurality of tick marks 81 are displayed corresponding to the positions of range indicator 80. Such positions correspond to values or settings associated with target objects (also referred to as targets) as described further below. Accordingly, range indicator 80 represents an adjustment range of values or settings corresponding to the positions.

In the depicted printer driver configuration, the target objects correspond to printers capable of being driven and the values or settings refer to the job status update frequency of such printers. In the described embodiment, ten printer-target objects are capable of being driven and such are referred to as "printer 1," "printer 2" up to "printer 10." Object control 78 has possible values associated with the job status update frequency of targets comprising printers in the described embodiment ranging from "never" (or zero) to "more often" (or five). Indicia 83 is provided adjacent appropriate tick marks 81 of range indicator 80 corresponding to at least some appropriate positions of range indicator 80. Such described arrangement is merely exemplary for describing operational aspects of the present invention. Other target objects and values may be represented and controlled using user interface 75.

Active indicator 82 and inactive indicator 84 of the illustrated configuration of user interface 75 are depicted as thumbs and are displayed relative to range indicator 80. Inactive indicators 84 are displayed as light-gray or faded silhouette representations of active indicator 82. Other arrangements are possible to show indicators 84 being in an inactive state different than that of active indicator 82.

Active and inactive indicator 82, 84 are utilized to display current settings or values of one or more target object (or sets of target objects) at a given moment in time in the described arrangement. For example, the positioning of an indicator 82, 84 represents the value or setting of the corresponding respective target or target set of the indicator. In accordance with one exemplary embodiment, active indicator 82 represents a composite setting or value corresponding to a plurality of targets at one moment in time and a setting of a single target at another moment in time. Inactive indicators 84 individually depict a setting or value of at least one target having a different setting or value than the composite setting or value of active indicator 82. Active indicator 82 additionally implements control operations and functionality as described further below.

Digital processing circuitry is operable to display active indicator 82 relative to range indicator 80 at one of the positions corresponding to a plurality of values of a plurality of targets (e.g., described in detail with reference to the "all printers" and "composite setting" discussions below) or corresponding to one target (e.g., as shown in FIG. 4B). Digital processing circuitry is further operable to display inactive indicator 84 relative to range indicator 80 at another one of the positions corresponding to a value of one of the targets as further described below.

Drop-down list box 76, shown in a closed configuration in FIG. 4, displays the target or target set associated with active indicator 82 at a given point in time. Such refers to the scope of user interface 75 in the illustrated configuration. Accordingly, drop-down list box 76 is one exemplary arrangement for providing a scope identifier within user interface 75 to depict the current scope of interface 75. Other scope identifier arrangements are possible.

Drop-down list box 76 may be also provided in an open configuration as shown in FIG. 4A to display other targets or target sets. Using input devices 16, a user can select a different target to change the scope of user interface 75. For example, a user controlling pointer or cursor 86 via the appropriate input devices 16 (such as a mouse) clicks drop-down list box 76 to provide it in an open state to expose possible targets for adjusting the scope of user interface 75.

As shown in FIG. 4 and FIG. 4A, the scope of user interface 75 is selectively set to a target set (e.g., "All Printers") according to aspects of the present invention. The appropriate processing circuitry 43 is configured by executable code to display active indicator 82 at one of the positions of range indicator 80 corresponding to a plurality of targets (position two in FIG. 4). In one arrangement, processing circuitry 43 determines a composite position to display active indicator 82 inasmuch as the plural targets may and typically have different associated targets or values. Referring to Table A below, exemplary values or settings of a target set are shown.

| Printer | Current Setting |
|---|---|
| Printer 1 | 2 |
| Printer 2 | 4 |
| Printer 3 | 2 |
| Printer 4 | 3 |
| Printer 5 | 2 |
| Printer 6 | 2 |
| Printer 7 | 2 |
| Printer 8 | 0 |
| Printer 9 | 3 |
| Printer 10 | 4 |

From the current settings depicted in Table A, a most common setting is value "two" with five of the target objects having that setting. Processing circuitry 43 is configured to calculate the composite value for displaying active indicator 82 relative to range indicator 80. Such may be determined according to a median or an average of values of all associated target objects, or a left-most (i.e., smallest) value of the target objects at a given moment in time. Other methodologies may be utilized to determine the appropriate position of active indicator 82 responsive to the selection of the scope of user interface 75 to a target set, such as "all printers" wherein the targets have different associated values. Processing circuitry 43 depicts active indicator 82 at the appropriate position of range indicator 82 corresponding to the determined composite setting.

Processor 42 is further configured to display one or more inactive indicator(s) 84 relative to range indicator 80 at other position(s) and corresponding to target(s) or target set(s) different than the current scope selection. In the described example and using data from Table A, other values or settings of targets having a smaller representation include one target set to value 0, none set to value 1, two targets set to value 3, two targets set to value 4, and no targets set to value 5. According to the present invention, active indicator 82 represents a composite setting or value and inactive indicators 84 represent alternate settings currently in use by one or more target. Corresponding to the data of Table A, active indicator 82 is displayed at position 2 while inactive indicators are displayed at positions of range indicator 80 at positions 0, 3 and 4. In accordance with one embodiment of the invention, when the scope of user interface 75 is set to all targets, both indicators 82, 84 may be depicted. However, when the scope is set to one target, only active indicator 82 is depicted in accordance with the presently described exemplary embodiment.

Such depicted configuration of user interface 75 is exemplary. Additional active indicators 82 may be provided to provide additional setting indications and control operations with respect to additional target. Additional scopes which may be indicated by additional displays such as additional drop-down box lists in such other arrangements.

Referring to FIG. 4B, such depicts the scope being set to one target (e.g., "printer 3"). According to Table A, the value of printer 3 is two at a given moment of time. Thus, active indicator 82 is depicted at position two upon range indicator 80 responsive to "printer 3" being selected within drop-down list box 76. In the depicted configuration, inactive indicators are not depicted when only one target is selected as the scope. Other configurations are possible.

User interface 75 also implements control functionality according to aspects of the present invention. For example, in one embodiment, a user utilizing input devices 16 manipulates cursor 86 to select active indicator 82. Thereafter, the user moves active indicator 82 to a new position upon range indicator 80. In this described arrangement, such movement and relocation of active indicator 82 affords or applies a new value or setting corresponding to the new position of active indicator 82 to the target(s) currently selected by the scope of user interface 75. Such described click and drag operations using cursor 86 are exemplary. Other selection and movement operations are possible. For example, a given user may desire to click upon a hot-zone of range indicator 80 to effect an appropriate value or setting change.

Where the scope is set to one target object (e.g., "printer 3" of the FIG. 4B screen display), selection and movement of active indicator 82 operates to control the setting or value of the target object selected ("printer 3" chosen in box 76). Accordingly, active indicator 82 depicts the current setting and permits control of the value or setting of the selected target object.

Where the scope is set to more than one target (e.g., "all printers" of the FIG. 4 screen display), selection and movement of active indicator 82 operates to change the setting or value of the targets belonging to the selected target set. Accordingly, all printers would receive the new setting or value according to the described exemplary operation of user interface 75. Inactive indicators 84 disappear in accordance with the described operation and inasmuch as the target objects receive the new setting indicated by the new position of active indicator 82.

Inactive indicators 84 return if a user selects another target object (e.g., "printer 1") from drop-down list box 76 and provides a new setting or value to the selected target object. Following selection of the other target object using box 76, the active indicator 82 is displayed at the initial composite position of range indicator 80 corresponding to the respective individual target object having the value previously applied to all targets of the set. Once the user selects (e.g., clicks) upon the active indicator 82 and moves it to a new position different than the most common or composite setting, a new setting or value is applied to the selected target. If the scope is later set to a target set including the target having the new value (e.g., "all printers"), such new value afforded to printer 1 is depicted as an inactive indicator 84 while active indicator 82 corresponds to the composite setting.

Figure 5:
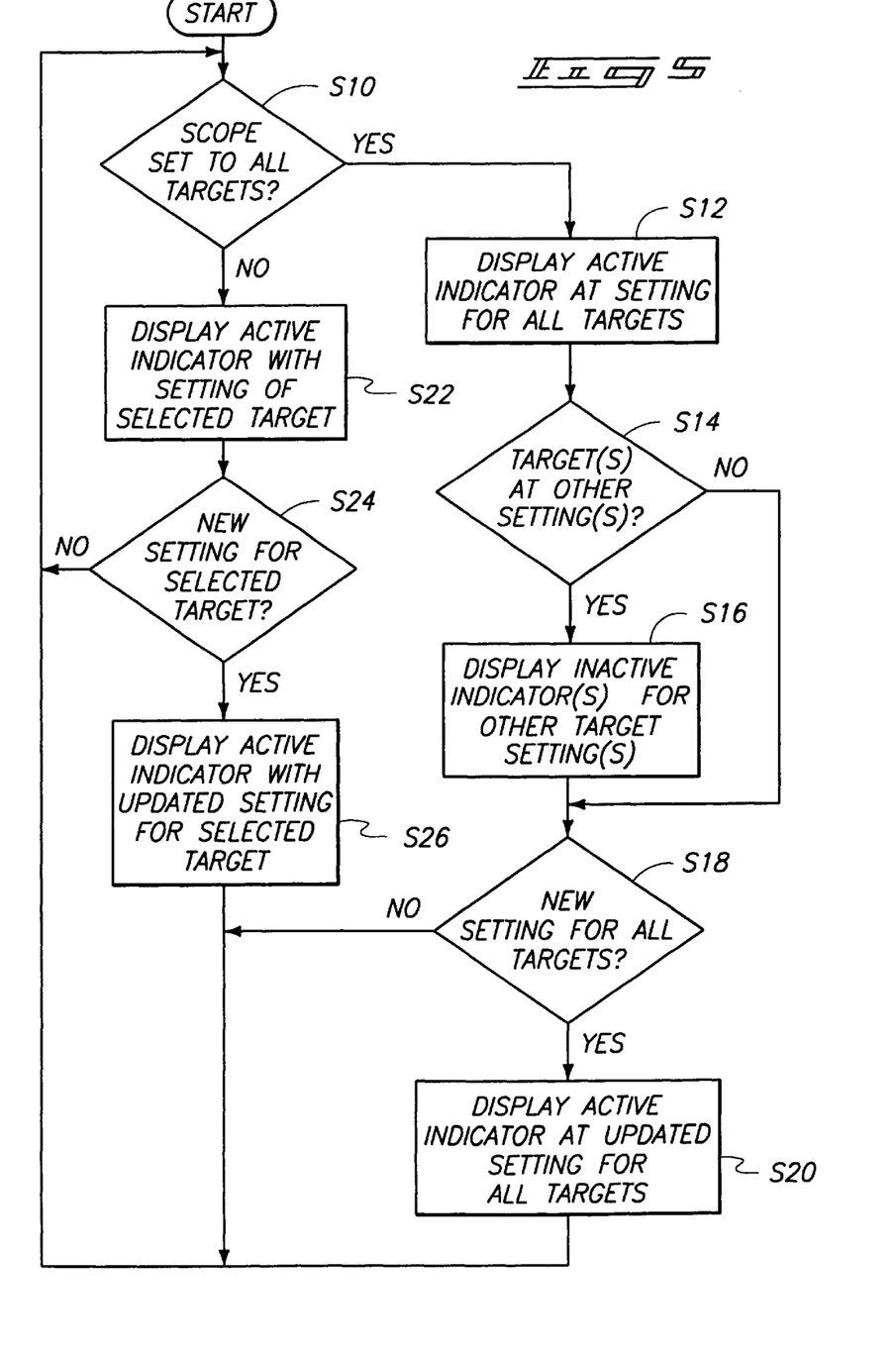
FIG. 5 is a flow chart illustrating an exemplary processor-implemented method for depicting the user interface according to one aspect of the present invention.
Figure 6:
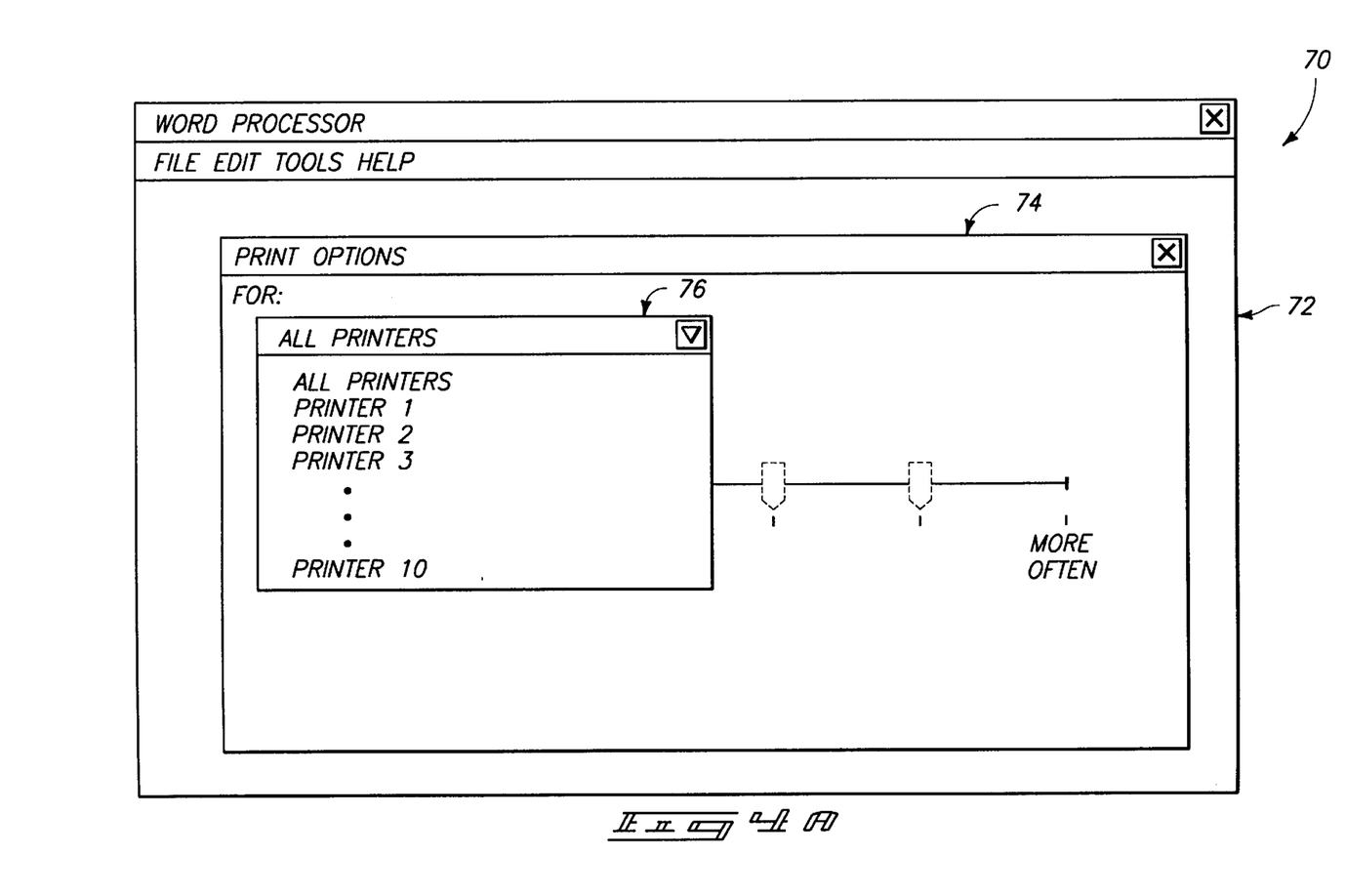

Referring to FIG. 5, an exemplary methodology implemented by processing circuitry or other suitable device in an exemplary embodiment of the i,present invention is shown. The depicted methods and other operations described herein are implemented using appropriate processing circuitry configured to execute processor-usable or executable code stored within appropriate storage devices or communicated via an external network coupled with the device. For example, processor-usable code may be provided via articles of manufacture, such as an appropriate processor-usable medium comprising, for example, a floppy disk, hard disk, zip disk, or CD-ROM, etc., or alternatively embodied within a transmission medium, such as a carrier wave, and communicated via a network, such as the Internet. The depicted method is implemented in hardware in other configurations.

Initially, at step S10, processing circuitry determines whether the scope is set to one or a target set (e.g., "all targets") in accordance with the presently described arrangement.

If so, processing circuitry proceeds to step S12 to display the active indicator at the setting for all targets. Such is referred to as the composite setting in the described embodiment.

At step S14, it is determined if other targets exist at other settings. If not, the processing circuitry proceeds to step Si 8. Otherwise, the processing circuitry proceeds to step S16.

At step S16, the processing circuitry displays inactive indicators for other existing target settings or values of such other targets.

At step S18, the processing circuitry determines whether there is a new setting for all targets. If not, the processing circuitry returns to step S10. Otherwise, the processing circuitry proceeds to step S20.

The processing circuitry displays the active indicator at the updated setting for all targets at step S20 and thereafter returns to step S10.

If the determination of step S10 is in the negative, the processing circuitry proceeds to step S22 wherein the processing circuitry displays the active indicator with the setting or value of the currently selected target.

At step S24, it is determined whether a new setting or value has been inputted for the selected target. If not, the processing circuitry returns to step S10. Otherwise, the processing circuitry proceeds to step S26.

At step S26, the processing circuitry displays an active indicator with an updated setting or value for the selected target and thereafter returns to step S10.

Aspects of the present invention provide a clearly visible distinction between active indicator 82 which may be selected (e.g., clicked upon) and non-selectable inactive indicators 84 which are used for indication purposes. Such described exemplary operation should minimize confusion of a user desiring to change a value of one or more targets.

As described herein, aspects of the present invention provide user interface 75 configured to represent more than one simultaneous value. Active indicator 82 depicts a composite setting corresponding to targets of a selected scope and enables the user to select and change the composite setting for the scope. Inactive indicators 84 are also provided representing other values associated with other target objects not having the composite setting.

For illustration, another exemplary embodiment or implementation of the present invention is to provide a single control to specify output volume for a multiple-channel sound mixer. A drop-down list box or control is provided with available sound sources that are being mixed and a control whose value determines the volume level for the associated or selected sound source target object. The drop-down list control or box would have an item labeled all sources which would be useful for setting a volume level for all sound sources simultaneously. Using the present invention, individual sound sources set to other values than the most common or composite value are displayed as inactive indicators while the composite value is displayed using the active indicator. Such also permits control of the active indicator using an appropriate user input device and in accordance with the above described details. Once again, the described implementations are for illustration and the present invention may be initialized in any arrangement or application wherein improved control and indication are desired.

The protection sought is not to be limited to the disclosed embodiments, which are given by way of example only, but instead is to be limited only by the scope of the appended claims.

What is claimed is:

1. A user interface apparatus comprising:
    a display device configured to display visual images; and
    digital processing circuitry coupled with the display device and configured to control the display device to display a range indicator corresponding to an adjustment range and comprising a plurality of positions, to display an active indicator relative to the range indicator at one of the positions corresponding to a plurality of values of a plurality of targets, and to display an inactive indicator relative to the range indicator at another one of the positions corresponding to the value of one of the targets.

2. The user interface according to claim 1 wherein the digital processing circuitry is configured to control the display device to display the range indicator, the active indicator and the inactive indicator as a slider control user interface.

3. The user interface according to claim 1 wherein the digital processing circuitry is configured to determine a composite value from the values of the targets and to display the active indicator relative to the range indicator at the one position corresponding to the composite value.

4. The user interface according to claim 1 further comprising an input device configured to receive control input, and wherein the digital processing circuitry is configured to select the active indicator and to move the active indicator to another position responsive to the control input, and to apply the value corresponding to the another position to the targets.

5. The user interface according to claim 1 wherein the digital processing circuitry is configured to control the display device to display indicia corresponding to the positions of the range indicator.

6. The user interface according to claim 1 wherein the digital processing circuitry is configured to control the display device to display a scope identifier.

7. A data signal embodied in a transmission medium comprising:
- processor-usable code configured to cause digital processing circuitry to display a range indicator corresponding to an adjustment range and comprising a plurality of positions;
- processor-usable code configured to cause digital processing circuitry to display an active indicator relative to the range indicator at one of the positions corresponding to a plurality of values of a plurality of targets; and
- processor-usable code configured to cause digital processing circuitry to display an inactive indicator relative to the range indicator at another one of the positions corresponding to the value of one of the targets.

8. The data signal according to claim 7 further comprising processor-usable code configured to cause digital processing circuitry to display the range indicator, the active indicator and the inactive indicator as a slider control user interface.

9. The data signal according to claim 7 further comprising processor-usable code configured to cause digital processing circuitry to determine a composite value from the values of the targets and to display the active indicator at the one position corresponding to the composite value.

10. An article of manufacture comprising:
- a processor-usable medium having processor-useable code embodied therein and configured to cause processing circuitry to perform steps comprising:
- displaying a range indicator corresponding to an adjustment range and comprising a plurality of positions;
- displaying an active indicator relative to the range indicator at one of the positions and corresponding to a plurality of values of a plurality of targets; and
- displaying an inactive indicator relative to the range indicator at another one of the positions and corresponding to the value of one of the targets.

11. The article of manufacture according to claim 10 wherein the processor-usable medium includes processor-usable code embodied therein configured to cause processing circuitry to display the range indicator, the active indicator and the inactive indicator as a slider control user interface.

12. The article of manufacture according to claim 10 wherein the processor-usable medium includes processor-usable code embodied therein configured to cause processing circuitry to determine a composite value from the values of the targets, and wherein the displaying the active indicator step comprises displaying the active indicator at the one position corresponding to the composite value.

13. An image forming system comprising:
- a host device configured to communicate data corresponding to an image; and
- an image forming device coupled with the host device and configured to receive the data and to provide the image upon media responsive to the received data;
- wherein at least one of the host device and the image forming device comprise:
  - a display device configured to display visual images; and
  - digital processing circuitry coupled with the display device and configured to control the display device to display a range indicator corresponding to an adjustment range comprising a plurality of positions, to display an active indicator relative to the range indicator at one of the positions corresponding to a plurality of values of a plurality of targets, and to display an inactive indicator relative to the range indicator at another one of the positions corresponding to the value of one of the targets.

14. The system according to claim 13 wherein the digital processing circuitry is configured to control the display device to display the range indicator, the active indicator and the inactive indicator as a slider control user interface.

15. The system according to claim 13 wherein the digital processing circuitry is configured to determine a composite value from the values of the targets and to display the active indicator relative to the range indicator at the one position corresponding to the composite value.

16. The system according to claim 13 further comprising an input device configured to receive control input, and wherein the digital processing circuitry is configured to select the active indicator and to move the active indicator to another position responsive to the control input, and to apply the value corresponding to the another position to the targets.

17. A processor-implemented method comprising:
- displaying a range indicator corresponding to an adjustment range comprising a plurality of positions;
- displaying an active indicator relative to the range indicator at one of the positions corresponding to a plurality of values of a plurality of targets; and
- displaying an inactive indicator relative to the range indicator at another one of the positions and corresponding to the value of one of the targets.

18. The method according to claim 17 wherein the displayings comprise displayings in a slider control user interface.

19. The method according to claim 17 further comprising determining a composite value from the values of the targets, and wherein the displaying the active indicator comprises displaying the active indicator at the one position corresponding to the composite value.

20. The method according to claim 17 further comprising:
- receiving control input;
- selecting and moving the active indicator to another one of the positions responsive to the receiving; and
- applying the value corresponding to the another one position to the targets.

21. The method according to claim 17 further comprising displaying indicia corresponding to the positions of the range indicator.

22. The method according to claim 17 further comprising displaying a scope identifier during the displayings.

23. The method according to claim 17 wherein the displaying the inactive indicator comprises displaying a plurality of inactive indicators relative to the range indicator at plural positions and corresponding to the values of respective targets.

24. A processor-implemented method comprising:
- displaying a slider control graphical user interface including a range indicator corresponding to an adjustment range comprising a plurality of positions;

displaying indicia corresponding to the positions of the range indicator;

determining a composite value from a plurality of values of a plurality of targets;

displaying an active indicator of the slider control graphical user interface relative to the range indicator at one of the positions corresponding to the composite value;

displaying a plurality of inactive indicators of the slider control graphical user interface relative to the range indicator at other positions corresponding to values of respective ones of the targets;

displaying a scope identifier during the displayings of the range indicator, active indicator and inactive indicators of the slider control graphical user interface;

receiving control input;

selecting and moving the active indicator to another one of the positions responsive to the receiving; and applying the value corresponding to the another one position to the targets.

25. The user interface apparatus according to claim 1 wherein the plurality of values comprise the same value.

26. The user interface apparatus according to claim 1 wherein the plurality of values comprise different values.

27. The user interface apparatus according to claim 1 wherein the targets individually comprise a variable having a plurality of respective possible values, and the active indicator is depicted at the one of the positions corresponding to the values for the variables of the targets.

28. The user interface apparatus according to claim 1 wherein the one of the positions for the active indicator is selected as the most common value of the plurality of targets.

29. The user interface apparatus according to claim 1 wherein the one of the positions for the active indicator is selected as a median of the values of the plurality of targets.

30. The user interface apparatus according to claim 1 wherein the one of the positions for the active indicator is selected as one of the largest and smallest values of the plurality of targets.

31. The user interface apparatus according to claim 1 wherein the digital processing circuitry is configured to control the display to depict the active identifier corresponding to a first scope at a first moment in time, and to control the display to depict the active identifier at another of the positions corresponding to a value of another target corresponding to a second scope at a second moment in time.

* * * * *